Taft & Mason
Screw Wrench,

No. 17,609. Patented June 16, 1857.

UNITED STATES PATENT OFFICE.

GEO. C. TAFT, OF WORCESTER, MASSACHUSETTS, ASSIGNOR TO HENRY W. MASON.

SCREW-WRENCH.

Specification of Letters Patent No. 17,609, dated June 16, 1857.

*To all whom it may concern:*

Be it known that I, GEORGE C. TAFT, of Worcester, in the county of Worcester and State of Massachusetts, have invented an Improved Screw-Wrench; and I do hereby declare that the same is fully described and represented in the following specification and the accompanying drawings, of which—

Figure 1:
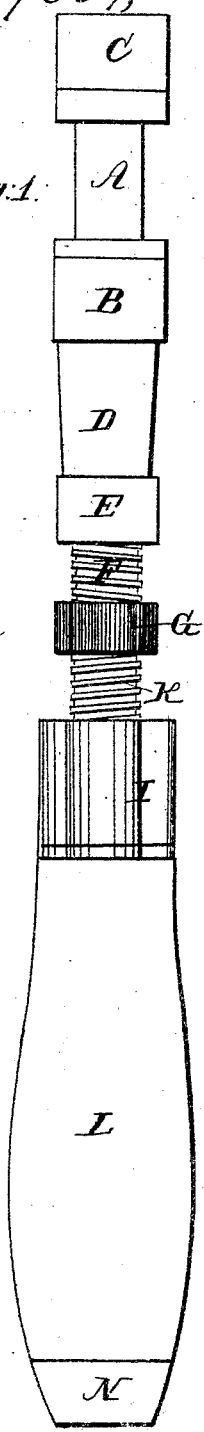
Figure 3:
Figure 2:
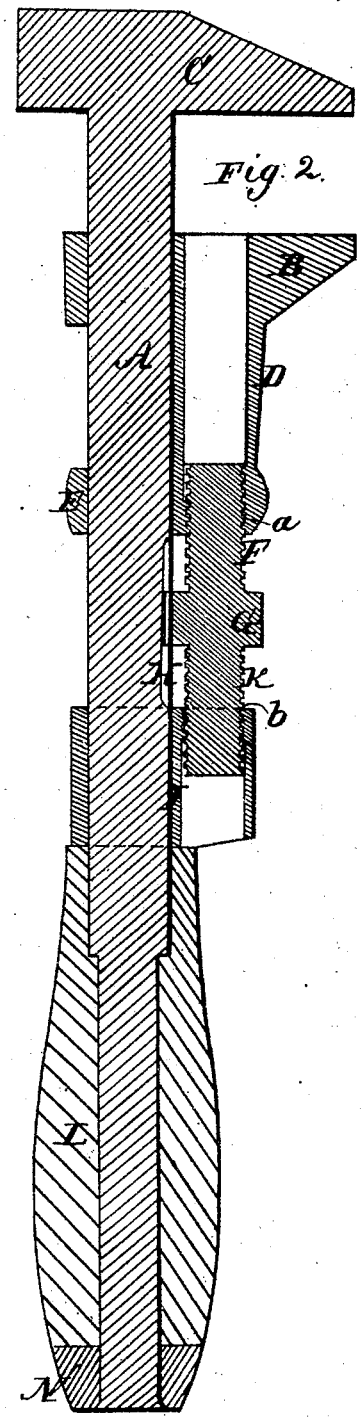

Figure 1, is a front elevation of such article. Fig. 2, a longitudinal section of it. Fig. 3, a transverse section of it taken through the thumb nut to be hereinafter described.

My invention is an improvement on that patented April 16th, 1841, by Loring Coes.

In the drawings, A, is the shank; B, the movable jaw; C, the hammer jaw; D, an extension from the jaw, B; E, a slide fastened to said extension; and embracing the shank; L, the handle and N, the holding nut thereof. The part D, is provided with a female screw, $a$, to which the screw F, is adapted, such screw F, being provided with a thumb nut G, by which it may be revolved. Extending down from the thumb nut, G, and with its axis in a straight line with that of the screw, F, is another male screw, K, fitted to work or screw into a female screw, $b$, formed in the projection I, that is extended from the shank A.

A groove H, is made in the shank A, for the nut G, to travel in during its movement in directions parallel to the shank. The nut G, the screw F, its female screw, the slider E, the shank A, the extension D, and the jaws B, and C, are arranged with regard to one another as seen in the drawings, such arrangement being the same as that of such parts in the said wrench of the said Coes. I apply and arrange a second screw K, and a nut $b$, with reference to them as above described, the threads of the two screws F, and K, being pitched contrary ways in order that when the nut G, is revolved, each revolution may move the jaw B, either toward or away from the jaw C, double the distance, that it could be moved were the nut G, and its screw F, to have no other than a rotary motion as in the wrench of the said Coes.

With my addition or improvement, the nut G, and its screws F, and K, when rotated also have a motion parallel with the shank A, and either toward or away from the jaw C, according to the direction in which the nut may be rotated.

I do not claim the invention of the aforesaid wrench of Loring Coes, on which a patent was granted to him on April 16th, 1841, for fourteen years and subsequently extended for seven years longer. My invention or wrench has an advantage over such wrench as, while it possesses all the essential features of the said Coes wrench, its sliding jaw can be moved with more rapidity than that of the said Coes wrench.

Although I have mentioned the second screw K, and its female screw, as an addition I have made to the wrench of the said Coes, I would further state that what constitutes my invention or improvement is not the mere addition of auxiliary male and female screws to the said Coes wrench, but my improvement is to be found in the manner in which they are applied with reference to the nut the handle and the shank. In my improved wrench, the two male screws F, and K, are arranged so as to project in opposite directions from the nut, G. The projection I, carrying the female screw $b$, extends from the shank A, and is arranged so as to rest against the upper end of the handle L, and at the same time it may form a ferrule to said handle. As the handle is held in the shank by the nut N, a force tending to move the jaw B, downward away from the jaw C, when the wrench is in use on a nut will be resisted by the nut N, and the jaw C. Furthermore, a force tending to bend or break the shank between the parts I, and E, or just above the handle will be resisted by the nut G, and the male screws, the nut by being sprung against the shank serving to prevent the screws from being bent.

I am aware of the construction of the wrench for which Nathan Whipple applied for a patent and was rejected on or about the 24th of May A. D. 1854, such wrench having an auxiliary male and female screw. In this wrench however, the auxiliary female screw was made in a piece of metal, made to embrace the shank and to be fastened to it by rivets extending through such piece and the shank. Besides this, the said piece of metal containing the auxiliary female screw was arranged at a considerable distance from the handle and did not rest on it. Furthermore the nut instead of being arranged between the two male screws was placed at the lower end of the lower screw and below the part carrying the auxiliary female screw. In this case, the nut could in no respect operate to prevent breakage of the shank under great lateral strain, nor did the shank nut at the lower end of the handle, serve with the handle in any manner to give support to the movable jaw as is the case in my improved wrench. In the wrench of the said Whipple, the shank owing to having rivet holes made through it is very much weakened thereby, and is liable to break off at or near such, all of which is avoided by my arrangement of parts. Therefore I do not claim the mere addition of auxiliary screws to the wrench of the said Coes and made with threads reversed in pitch with respect to the pitch of those of the primary screws, but What I do claim is—

Arranging the nut G, between the two male screws F, and K, in connection with applying the auxiliary female screw $b$, and its support I, with reference to the handle and shank substantially as specified.

In testimony whereof, I have hereunto set my signature, Mar. 28, 1857.

GEO. C. TAFT.

Witnesses:
W. A. WILLIAMS,
HENRY W. MASON.